United States Patent
Hansen et al.

(10) Patent No.: US 7,186,118 B2
(45) Date of Patent: Mar. 6, 2007

(54) ELECTRIFICATION SYSTEM FOR USE IN A VEHICLE

(75) Inventors: Scott A. Hansen, Holland, MI (US); John D. Spencer, Allendale, MI (US); Jeremy J. Gauthier, Plainwell, MI (US); Miklos A. Kovach, Holland, MI (US); Elindo G. Castro, Wyoming, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 11/387,091

(22) Filed: Mar. 22, 2006

(65) Prior Publication Data

US 2006/0276065 A1 Dec. 7, 2006

Related U.S. Application Data

(60) Provisional application No. 60/664,342, filed on Mar. 23, 2005.

(51) Int. Cl.
*H01R 33/00* (2006.01)

(52) U.S. Cl. .................. 439/34; 439/118; 296/37.8; 296/24.34

(58) Field of Classification Search ............. 439/34, 439/110–122; 174/72 A; 180/311, 312; 307/10.1, 10.8; 296/37.8, 37.14, 24.1, 37.7, 296/24.34; 224/540, 281
See application file for complete search history.

(56) References Cited

U.S. PATENT DOCUMENTS

| | | | | | |
|---|---|---|---|---|---|
| 2,943,292 | A | * | 6/1960 | Hermann et al. | ............ 439/122 |
| 3,081,442 | A | * | 3/1963 | Platz | ........................... 439/94 |
| 3,109,598 | A | * | 11/1963 | Morgan | ....................... 362/549 |
| 3,321,731 | A | * | 5/1967 | Goldbaum | .................. 439/120 |
| 3,341,802 | A | * | 9/1967 | Baldwin et al. | ............ 439/116 |
| 3,451,035 | A | * | 6/1969 | Baldwin | ..................... 439/117 |
| 3,910,371 | A | * | 10/1975 | Magrini | ....................... 180/90 |
| 4,074,924 | A | * | 2/1978 | Lebecque | ....................... 439/1 |
| 4,190,309 | A | * | 2/1980 | Glass | ......................... 439/118 |
| 4,243,284 | A | * | 1/1981 | Humphreys | ................. 439/113 |
| 4,537,089 | A | * | 8/1985 | Moneta | ........................ 74/493 |
| 4,638,666 | A | * | 1/1987 | Wong et al. | .................. 73/431 |
| 4,919,625 | A | * | 4/1990 | Coutre | ....................... 439/118 |
| 4,924,957 | A | * | 5/1990 | Gigla | ........................... 180/90 |
| 5,259,655 | A | * | 11/1993 | Anderson | ..................... 296/70 |
| 5,325,275 | A | * | 6/1994 | Liu | ............................. 362/490 |
| 5,632,183 | A | * | 5/1997 | Rixon et al. | .................. 74/512 |
| 5,759,051 | A | * | 6/1998 | Cancellieri et al. | ......... 439/118 |
| 5,915,776 | A | * | 6/1999 | Bieri | ........................ 296/37.12 |
| 6,135,529 | A | * | 10/2000 | De Angelis et al. | ....... 296/37.8 |
| 6,203,088 | B1 | * | 3/2001 | Fernandez et al. | ....... 296/37.89 |

(Continued)

*Primary Examiner*—Gary F. Paumen
(74) *Attorney, Agent, or Firm*—Foley & Lardner LLP

(57) ABSTRACT

An electrification system for use with an article slidably supported on a track within a vehicle is provided. The electrification system comprises a conductor assembly including a positive conductive interface supported parallel and adjacent to a negative conductive interface. The conductor assembly is configured to extend substantially the length of the track. The electrification system further comprises a contact assembly including a positive contact in electrical communication with the positive conductive interface and a negative contact in electrical communication with the negative conductive interface. The contact assembly is configured to be fixed relative to the article. The contact assembly remains in electrical communication with the conductor assembly as the article is selectively moved along the track to provide continuous electrical power to the article as the article is moved.

20 Claims, 10 Drawing Sheets

U.S. PATENT DOCUMENTS

| | | | |
|---|---|---|---|
| 6,360,629 B2 * | 3/2002 | Schambre et al. | 74/512 |
| 6,441,510 B1 * | 8/2002 | Hein et al. | 307/10.1 |
| 6,752,444 B2 * | 6/2004 | Kitano et al. | 296/184.1 |
| 6,780,020 B2 * | 8/2004 | Kondo et al. | 439/34 |
| 6,840,783 B2 * | 1/2005 | Wolford et al. | 439/110 |
| 6,921,118 B2 * | 7/2005 | Clark et al. | 296/24.34 |
| 6,971,699 B2 * | 12/2005 | Isaacson | 296/37.8 |
| 7,063,562 B2 * | 6/2006 | Henley et al. | 439/502 |
| 7,086,874 B2 * | 8/2006 | Mitchell et al. | 439/110 |
| 2003/0045132 A1 * | 3/2003 | Lee | 439/34 |
| 2005/0215095 A1 * | 9/2005 | Mitchell et al. | 439/110 |
| 2005/0258663 A1 * | 11/2005 | Huisingh et al. | 296/37.7 |

* cited by examiner

ELECTRIFICATION SYSTEM FOR USE IN A VEHICLE

CROSS-REFERENCE TO RELATED PATENT APPLICATIONS

This application claims the benefit under 35 U.S.C. § 119(e) of U.S. Provisional Patent Application No. 60/664,342, entitled "Electrification System for Use in a Vehicle," filed Mar. 23, 2005, the disclosure of which is incorporated herein by reference in its entirety.

BACKGROUND

The present invention relates generally to an electrification system for use in a vehicle. More particularly, the present invention relates to an electrification system providing electrical power to an article, such as a console, that is slidably movable or detachably coupled in a vehicle.

The positioning of electrical and electronic articles throughout a vehicle is generally known. Often the electrical and electronic articles positioned throughout a vehicle are nested in modular systems, such as consoles. Such systems are often fixed in a single location and may include storage compartments; instruments such as compasses, temperature displays, and clocks; gauges; cup holders; functional devices such as the gear shift lever or the parking brake actuator; a plurality of electrical functionality such as controls for entertainment systems, climate control, seat adjustment, mirror adjustment, window adjustments, vehicle lighting, rear window defroster switches, as well as for devices such as radios, telephones, or computer power ports; etc.

In addition to fixed modular systems, it is also generally known to provide a system that is slideably movable in the vehicle. For example, such a movable system is described in commonly-owned U.S. Pat. No. 6,921,118 titled "Sliding and Nesting Console System" and filed as application Ser. No. 10/310,715 on Dec. 5, 2002, the entire disclosure of which is incorporated by reference herein. Often, such systems are translatable in the fore and aft directions of the vehicle. Providing a movable system allows a user in the rear portion of a vehicle to enjoy the functionality of the system that could otherwise only be enjoy by a user in the front of vehicle. Article attachment systems are generally used to provide for the slidable movement of an article. A typical article attachment system providing the slidable mounting of an article uses a track mechanism similar to one used for vehicle seating to provide for the fore and aft movement of the articles within a vehicle.

If one or more electrical and/or electronic articles are nested in a console that is coupled to an article attachment system providing for the slidable movement of the console, then a source of electrical power must be operatively coupled to the console in order for the articles to be electrically functional as the console is slideably moved throughout the vehicle. In addition, if one or more electrical and/or electronic articles are detachably coupled throughout a vehicle, then an electrical power source is needed at the point of coupling in order for the articles to be electrically functional.

Therefore, it would be advantageous to provide an electrification system capable of providing electrical power throughout a vehicle. It would further be advantageous to provide an electrification system capable of providing electrical power to an article as the article is slidably moved along an article attachment system (e.g. sliding floor console, overhead console, cargo area console, seating, etc.). It would also be advantageous to provide an electrification system capable of providing electrical power to one or more articles that are detachably coupled to a vehicle. It would further be advantageous to provide an electrification system configured to minimize intermittencies in the transmitting of electrical current to an article coupled to the electrification system. It would further be advantageous to provide an electrification system capable of providing electrical power to a plurality of articles coupled throughout a vehicle. It would further be advantageous to provide an electrification system having conductive surfaces that are self-cleaned. It would further be advantageous to provide an electrification system that may be coupled to an article attachment system in a manner that minimizes the introduction of contaminants and other foreign materials generally found within a vehicle.

Accordingly, it would be advantageous to provide an electrification system having these or other advantageous features.

SUMMARY

The present invention relates to an electrification system for use with an article attachment system coupled to a vehicle. The electrification system includes a conductor assembly and a contact assembly. The conductor assembly may be coupled to, or near, the article attachment system and includes a positive conductive surface positioned parallel to a negative conductive surface. The conductor assembly may also include an insulator for separating the positive conductive surface from the negative conductive surface. The contact assembly is operatively coupled to an article and slidably engages the conductor assembly. The contact assembly includes a positive contact and a negative contact. The electrification system provides electrical power to an article coupled to the article attachment system as the article is slidably positioned throughout the vehicle.

The present invention relates to sliding console system for a vehicle. The sliding console system includes a track, a console support on the track and configured for sliding movement relative to the track, a conductor assembly extending substantially parallel to the track, and a contact assembly fixed relative to the console. The conductor assembly includes a positive conductive interface supported parallel and adjacent to a negative conductive interface. The contact assembly includes a positive contact in electrical communication with the positive conductive interface and a negative contact in electrical communication with the negative conductive interface. The contact assembly remains in electrical communication with the conductor assembly as the console slides relative to the track to provide continuous electrical power to the console.

The present invention also relates to a method for providing electrical power to at least one article detachably coupled to a vehicle. The method includes providing a conductor assembly and a contact assembly. Coupling the conductor assembly to the vehicle. The conductor assembly includes a positive conductive surface positioned parallel to a negative conductive surface. The conductor assembly also includes an insulator for separating the positive conductive surface from the negative conductive surface. The method further includes coupling the contact assembly to an article sliding supported within the vehicle. The contact assembly includes a resilient positive contact and a resilient negative contact. The method further includes slidably engaging the contact assembly with the conductor assembly to provide electrical power to the article slidably supported within the vehicle.

DETAILED DESCRIPTION

Figure 1:
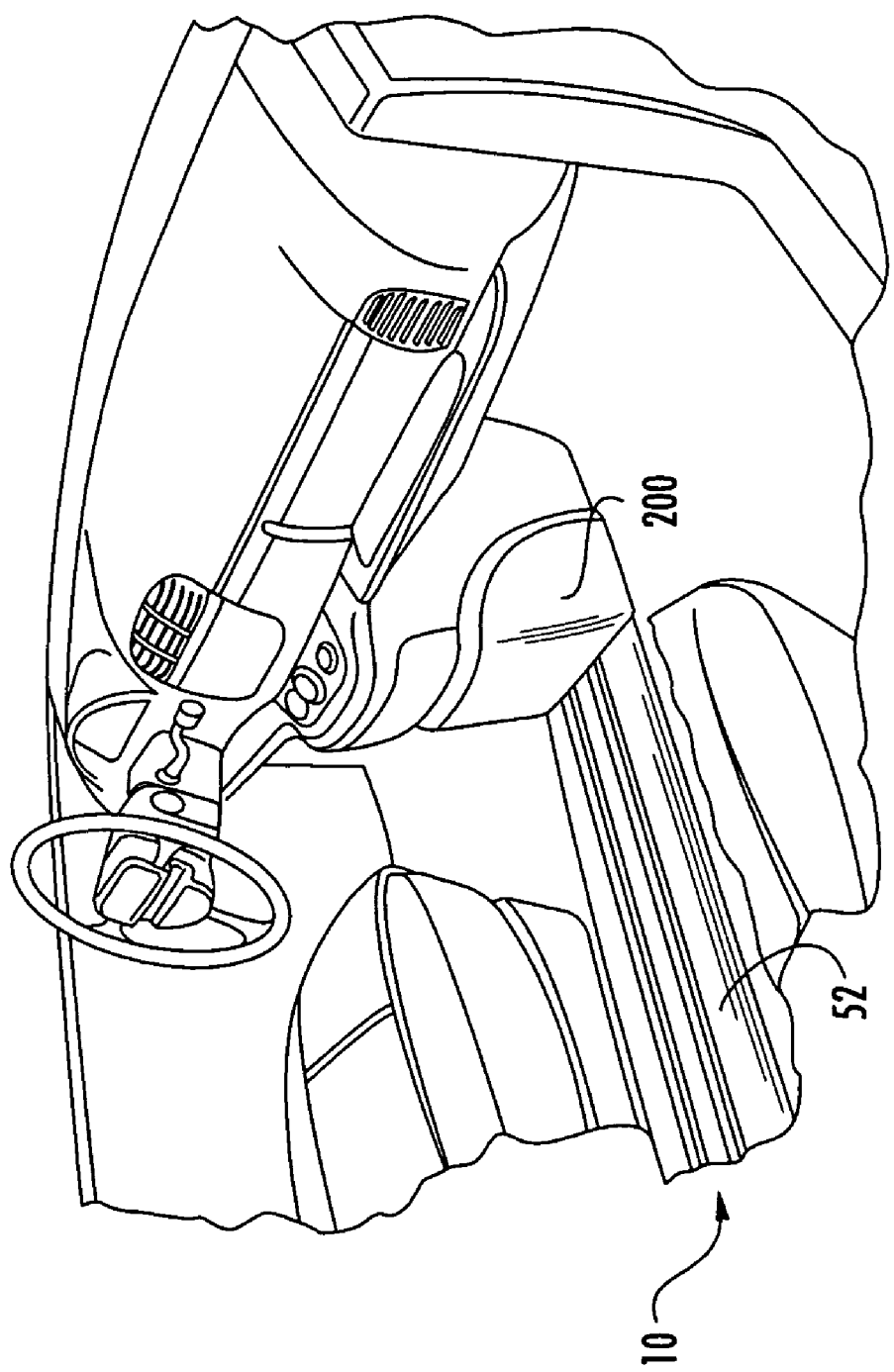
FIG. 1 is a perspective view of a sliding console system shown in a nested position according to an exemplary embodiment.

Referring generally to all of the FIGURES, an electrification system 10 is shown according to an exemplary embodiment. Electrification system 10 is configured to provide electrical power to an article (e.g., console, headliner module, etc.) that this movably supported relative to a vehicle, and more specifically, is configured to provide substantially continuous or otherwise uninterrupted electrical power to the article as it is being selectively moved relative to the vehicle. Electrification system 10 generally comprises an article attachment system 50, a conductor assembly 20, and a contact assembly 30. Article attachment system 50 generally includes a carriage 54 movably supported about a track member 52. The article and contact assembly 30 are fixed relative to carriage 54, while conductor assembly 20 is fixed relative to track member 52. In operation, contact assembly 30 remains in electrical communication with conductor assembly 20 as carriage 54 (including the article) is positioned, repositioned, and/or moved relative to track member 52 to provide a source of electrical power for the article.

Figure 2:
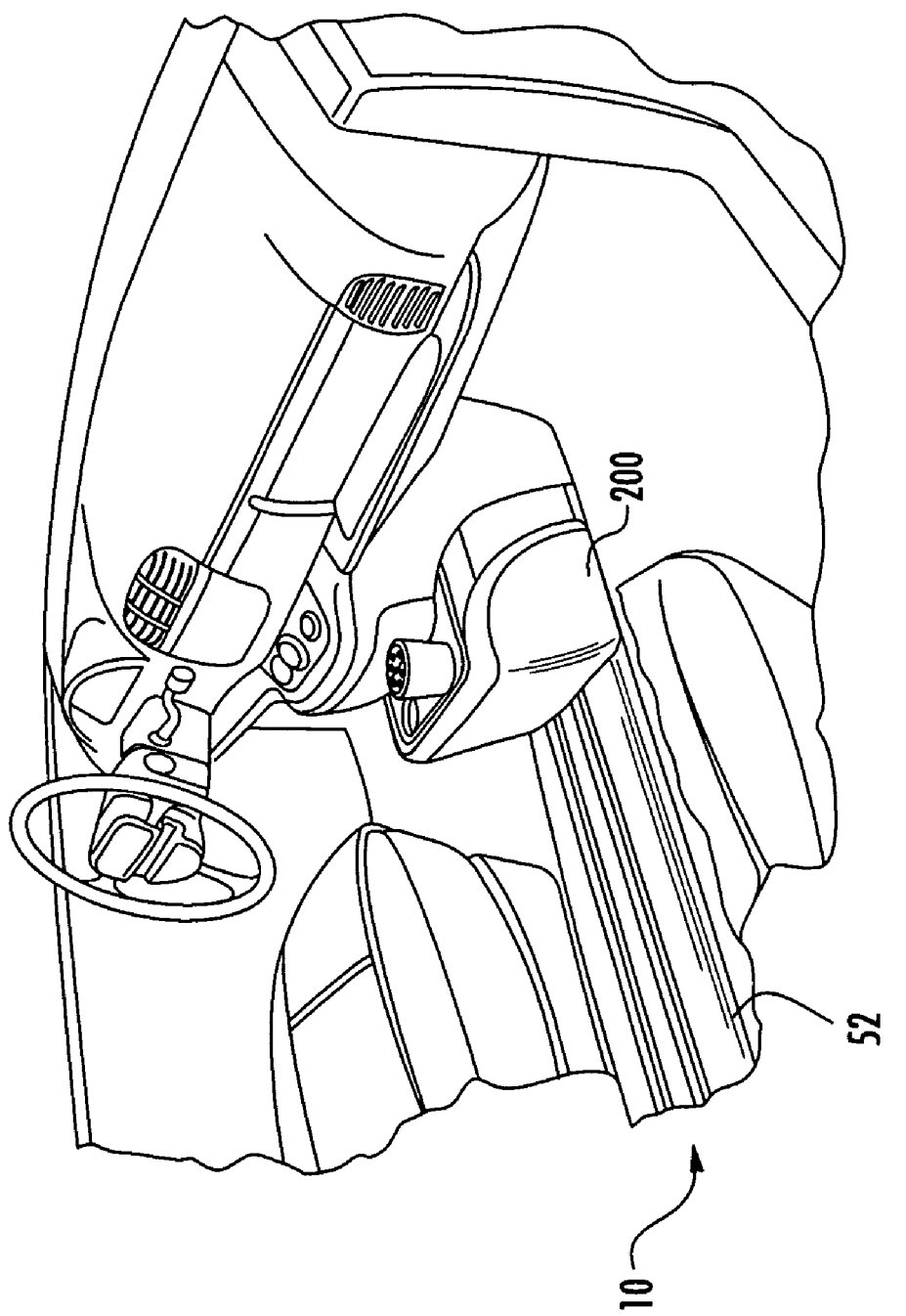
FIG. 2 is a perspective view of the sliding console system of FIG. 1 shown in a partially nested position.
Figure 3:
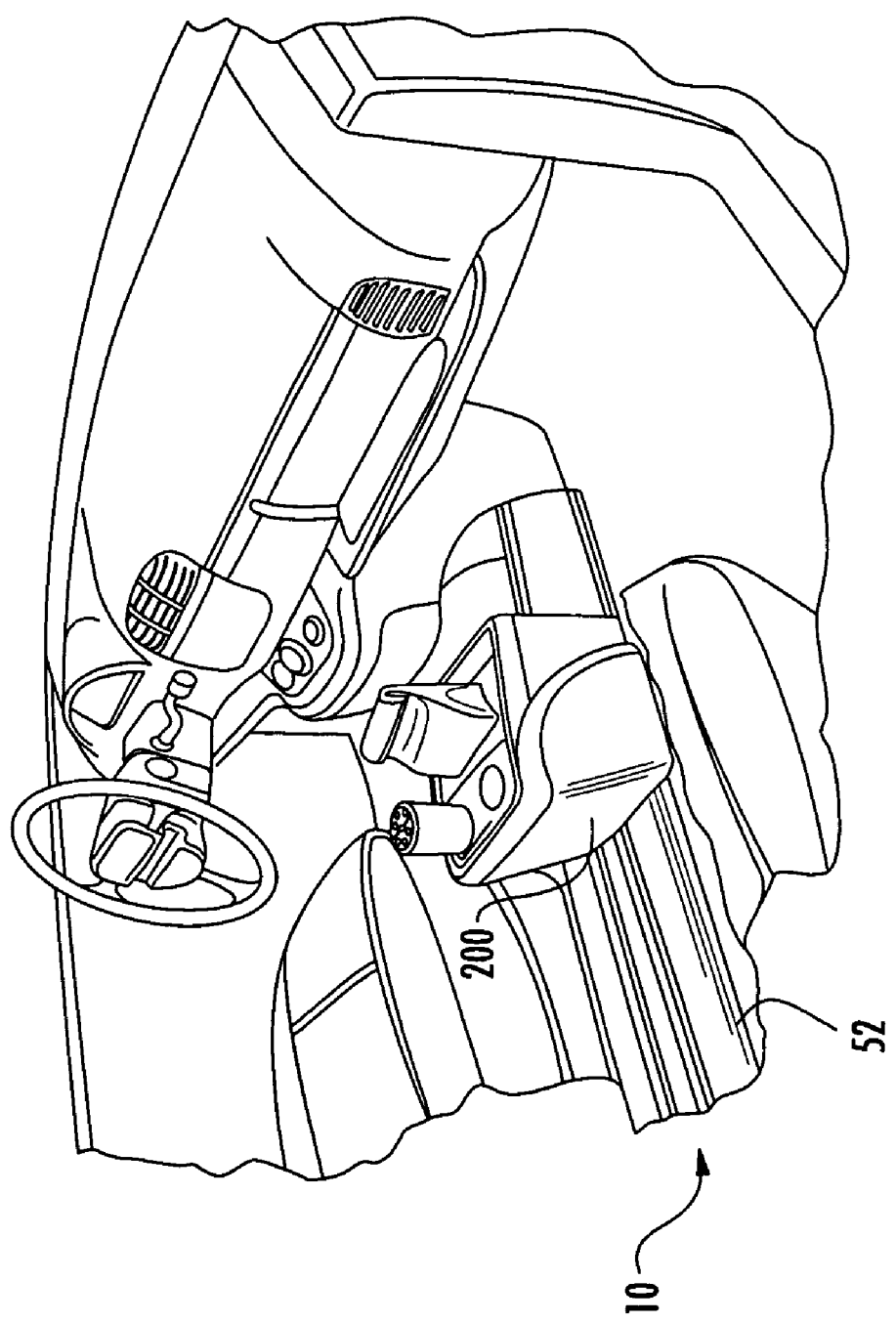
FIG. 3 is a perspective view of the sliding console system of FIG. 2 shown in an extend position.

Referring initially to FIGS. 1 through 3, electrification system 10 is shown in conjunction with sliding center console 200. It should be noted at the outset that the illustration of electrification system 10 with sliding center console 200 is for explanatory purposes only, and is not intended to be limiting. Electrification system 10 is suitable for use with any vehicle article that may be supported in a movable manner and for which it is desirous to provide with electrical power (e.g., headliner modules, entertainment devices such as display screens, DVD players, stereo systems, etc., information devices such as compasses, vehicle gauges, etc.).

Referring further to FIGS. 1 through 3, console 200 is configured to support a variety of functional features such as container holders, cavities, trays, can or cup holders, electrical devices, electrical ports, and/or controls for various vehicular functions (e.g., gear shift, lights, radio, HVAC, etc.). According to the embodiment illustrated, console 200 is configured to be movable between a nested position (shown in FIG. 1), an intermediate or partially nested position (shown in FIG. 2), and an extended position (shown in FIG. 3). Console 200 is supported by carriage 54 (shown in FIG. 4), and the various positions of console 200 are achieved by selectively sliding console 200 in a fore and aft direction of the vehicle about track member 52 (shown more clearly in FIG. 4). Providing a console that is translatable in the fore and aft direction can allow a user in a rear portion of a vehicle to utilize the functionality of the console that could traditionally only be enjoyed by a user in a front of a vehicle. In order for console 200 to remain electrically functional, electrical power must be supplied to console 200 as it is slidably moved or otherwise selectively moved throughout the vehicle.

Figure 4:
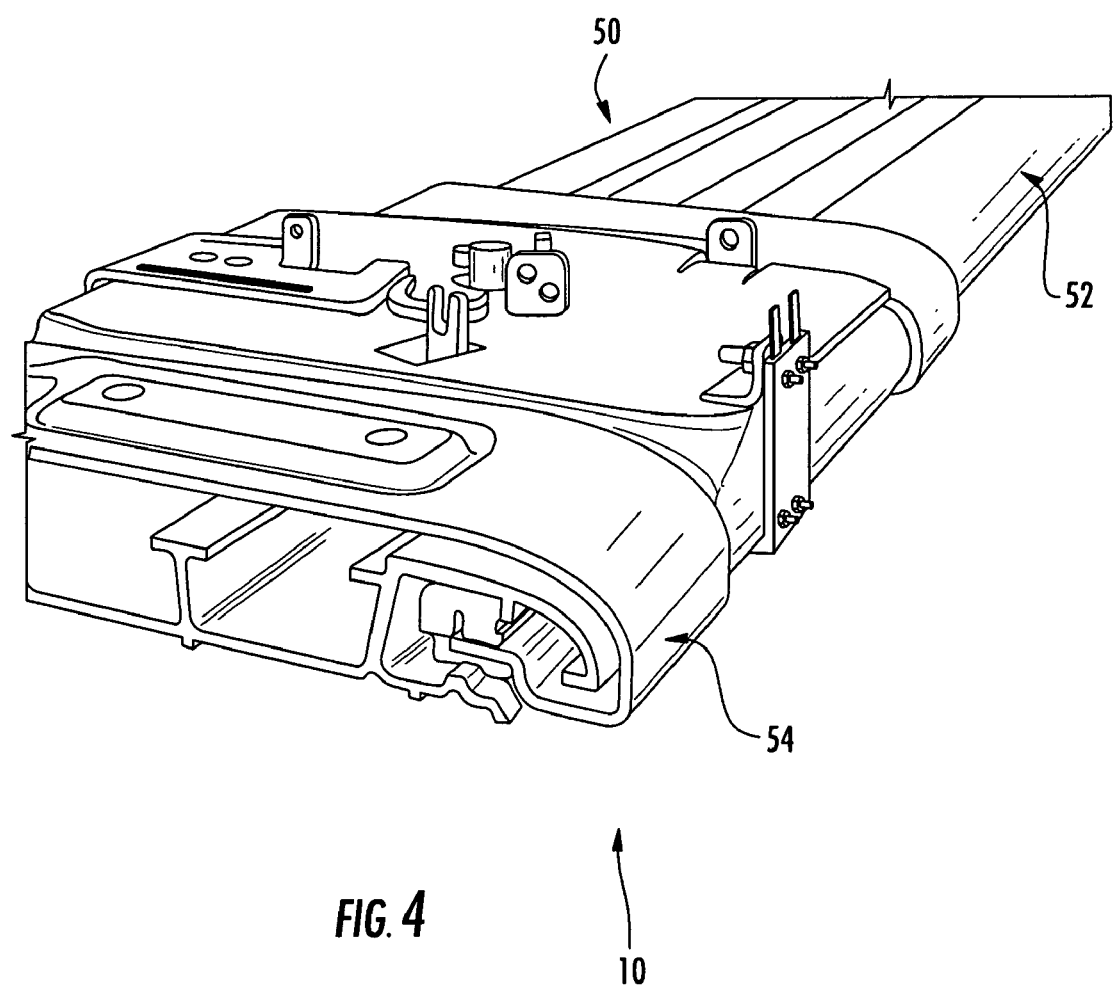
FIG. 4 is a perspective view of an electrification system according to an exemplary embodiment.

Referring to FIG. 4, electrification system 10 for providing power to one or more articles (e.g., console 200, etc.) is shown according to an exemplary embodiment. Electrification system 10 may be added to an existing article attachment system 50 of the vehicle or may be integrated with article attachment system 50. Article attachment system 50 generally includes an elongated base member (e.g. guide, runner, rail, etc.) shown as track member 52, and a movable support interface (e.g. slider, cover, bracket, etc.) shown as carriage 54, adapted to engage track member 52 in a reciprocatingly slidable relationship and to support in a movable or stationary manner an article (console, storage device, container, consumer object, electronics, plug-in port, etc.).

Article attachment system 50 may be adapted for attaching and slidably positioning articles along an interior of a vehicle (e.g. floor, door or side panel, headliner, etc.). According to various alternative embodiments, article attachment system 50 may be adapted for attaching and slidably positioning articles to an exterior portion of a vehicle (e.g. cargo areas or a truck bed). According to further alternative embodiments, article attachment system 50 may be used internally or externally in any other vehicle applications such as farm or constructions equipment, boats, aircraft, etc.

Figure 5:
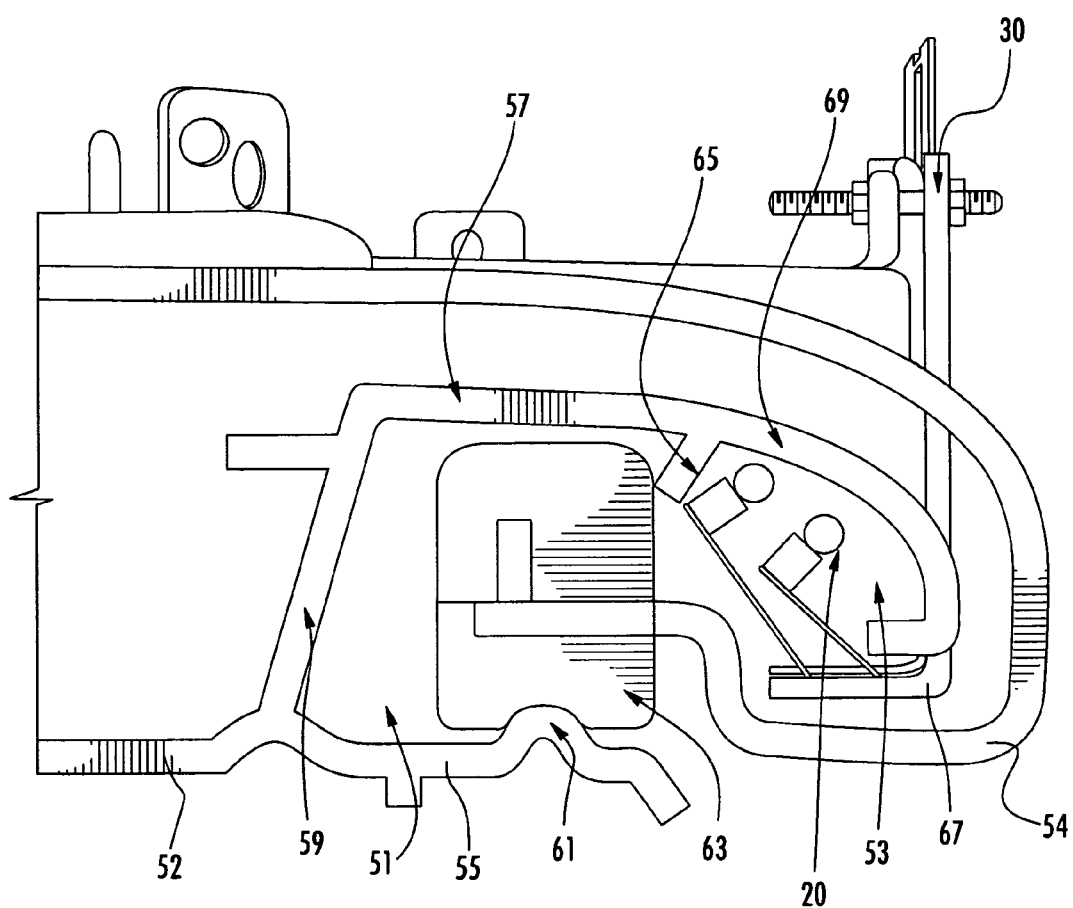
FIG. 5 is a front view of the electrification system of FIG. 4.

Referring to FIGS. 4 and 5, track member 52 (e.g., track, rail, slide, guide, etc.) is an elongated and generally rigid member that is configured to be coupled to a structure, such as the floorboard, sidewall, or headliner of an automobile, and to generally serve as a guide for carriage 54. According to an exemplary embodiment, track member 52 is a symmetrical one-piece track that includes an right guide portion and a left guide portion. It should be noted that the terms "right" and "left" as used in connection with track member 52 are intended to refer to the relative position of the particular component or feature of the tracks relative to the vehicle to which the track is coupled.

As best shown in FIG. 5, each guide portion includes a first channel 51 and a second channel 53. First channel 51 is configured to receive a portion of carriage 54, while second channel 53 is configured to receive a portion of contact assembly 30. First channel 51 is a generally U-shaped channel that faces outwardly. First channel 51 is formed by two generally horizontal walls 55 and 57 (the two legs of the "U") that are joined together by a slightly angled intermediate wall 59 (the base of the "U"). The length of intermediate wall 59 defines the height of first channel 51. Wall 55 includes a projection 61 extending substantially the length of track member 52. Projection 61 is configured to provide additional guidance for carriage 54. According to an exemplary embodiment, a friction reducing member or bearing surface 63 coupled to carriage 54 is configured to slidably engage projection 61.

Second channel 53 is a somewhat C-shaped channel that faces substantially downwardly. Second channel 53 is formed by a generally vertical sidewall 65 and a generally horizontal sidewall 67 (the two legs of the "C") that are joined together by a generally arcuated intermediate wall 69 (the base of the "C"). As detailed below, second channel 53 is configured to receive conductor assembly 20 and protect conductor assembly from contaminants (e.g., dirt, tampering, etc.).

Figure 6:
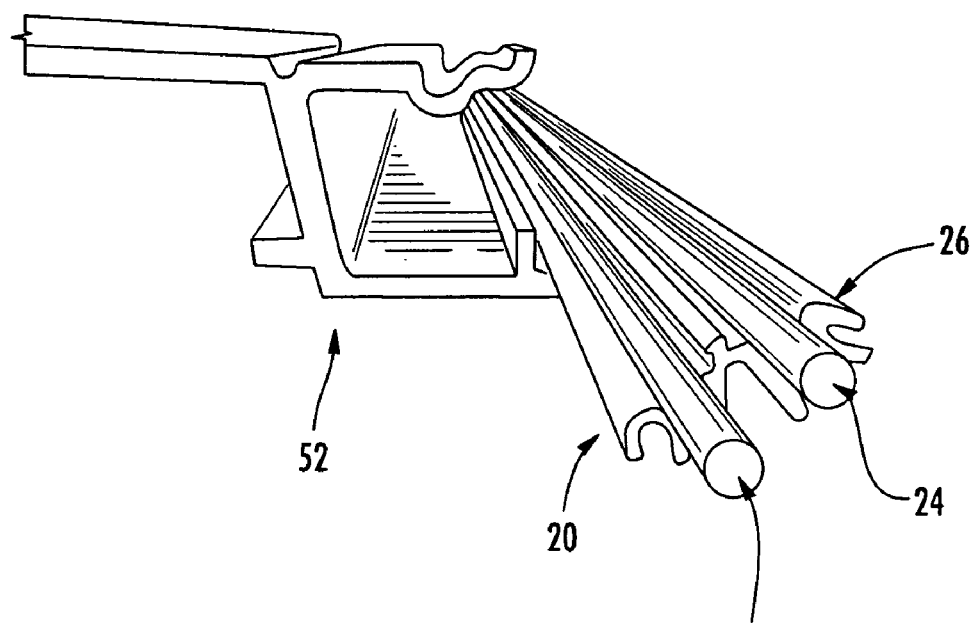
FIG. 6 is a perspective view of a conductor assembly of the electrification system of FIG. 4.
Figure 7:
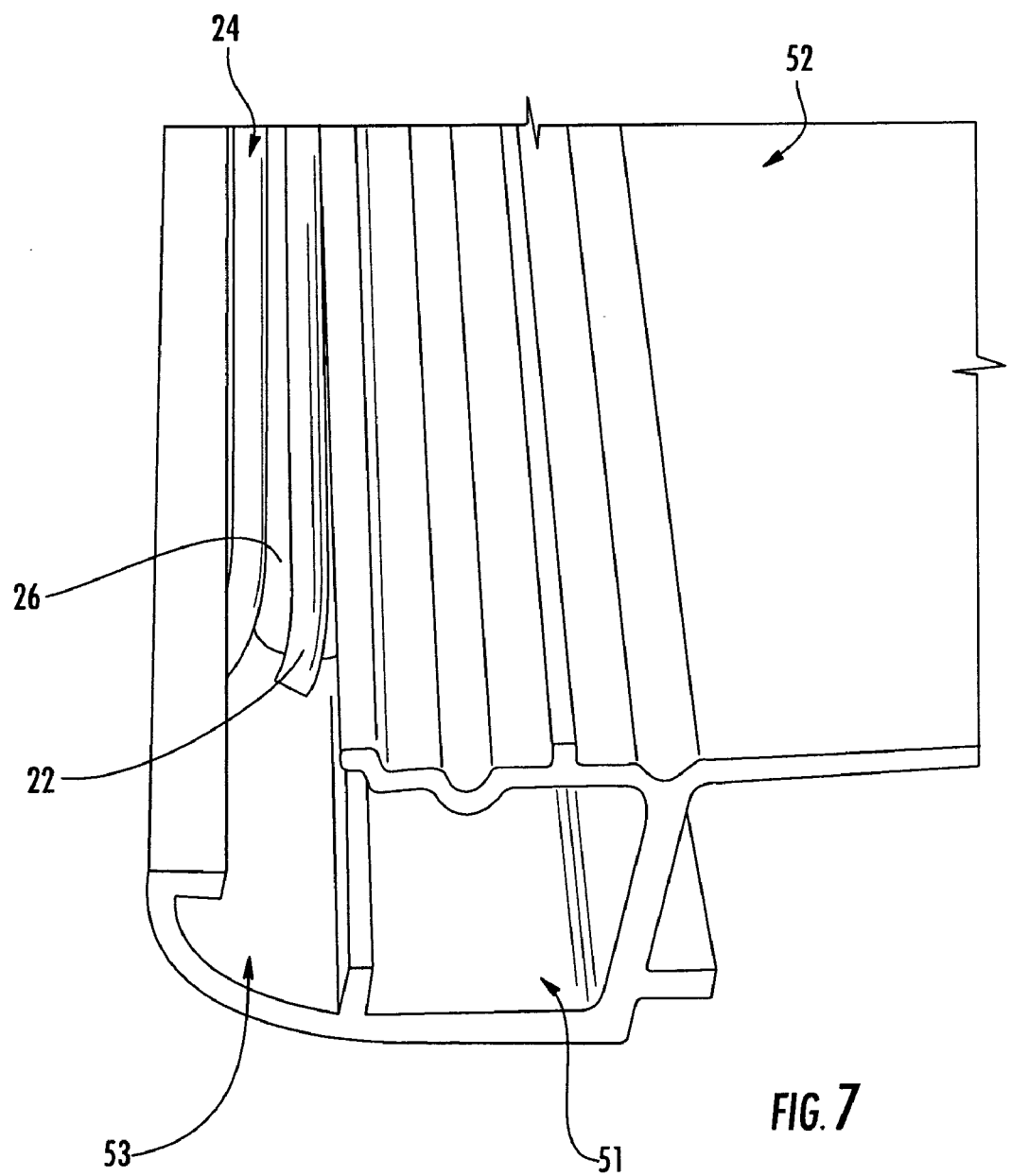
FIG. 7 is another perspective view of the conductor assembly of the electrification system of FIG. 4.

Referring to FIGS. 6 and 7, electrification system 10 further includes an elongated conductor carrier, shown as conductor assembly 20, adapted to provide electrical power along the longitudinal length of track member 52, and a movable electrical power interface (e.g. slider, bracket, connector) shown as contact assembly 30, adapted to engage conductor assembly 20 in a reciprocatingly slidable relationship and to transfer power from conductor assembly 20 to an article coupled to article attachment system 50. Conductor assembly 20 and contact assembly 30 cooperate to provide electrical power to one or more articles coupled to an article attachment system that are slidably movable or otherwise selectively positionable about the vehicle.

Referring to further to FIGS. 6 and 7, conductor assembly 20 includes a positive conductive surface (shown as positive rail 22) having a positive electric polarity (i.e. battery potential), a negative conductive surface (shown as negative rail 24) having a negative electric polarity (i.e. ground) and a conductor carrier (e.g. holder, separator, etc.) shown as insulating member 26 providing an insulating separation between positive rail 22 and negative rail 24. According to the embodiment illustrated, positive rail 22 and negative rail 24 are cylindrical members extending parallel to each other. Each rail 22 and 24 has a substantially uniform cross-section (e.g., a circular cross-section, etc.) and is formed of a conductive material (e.g., brass, etc.). According to various alternative embodiments, positive rail 22 and negative rail 24 may have any of a variety of suitable cross-sectional shapes (e.g. rectangular, polygonal, octagonal, etc.). Further, positive rail 22 and negative rail 24 may be made of any other conductive material including, but not limited to, aluminum and copper. Further, positive rail 22 and negative rail 24 are not limited to cylindrical members, and could include members having non-uniform cross-sections or intermittently positioned conductive surfaces. According to further alternative embodiments, positive rail 22 and negative rail 24 may be formed as conductive strips (e.g. stampings) coupled to insulating member 26 and made of any conductive material.

Insulating member 26 is an extruded member extending the length of positive rail 22 and negative rail 24, and composed of a electrically insulating material such as Poly Vinyl Chloride (PVC). According to various alternative embodiments, insulating member 26 may be composed of any dielectric material such as a polymer, ABS, blends of polymers, etc. Insulating member 26 is configured to accept the parallelly aligned positive rail 22 and negative rail 24, and to provide an insulated barrier (i.e. separation, divider, partition, etc.) between the opposite polarities. To facilitate the coupling of positive rail 22 and negative rail 24 to insulating member 26, insulating member 26 includes receptacles (e.g. channels, grooves, slots, etc.) for accepting positive rail 22 and negative rail 24. Positive rail 22 and negative 24 may be coupled to insulating member 26 in a variety of ways such as insertion, snap-fit, ultrasonic welding, molding, fasteners, etc. According to various alternative embodiments, positive rail 22 and negative rail 24 may be integrally formed with insulating member 26 as a single unitary body formed as a one-piece member.

Conductor assembly 20 may be coupled to or supported adjacent to track member 52 using a variety of suitable techniques. According to the embodiment illustrated, conductor assembly 20 is coupled to track member 52 by being received by a receptacle (e.g. channels, grooves, slots, etc.) of the inner structure of track member 52. Specifically, insulating member 26 is configured for insertion into channel 53 of track member 52 where carriage 54 slidably engages with track member 52. Coupling conductor assembly 20 to a substantially concealed area such as channel 53 of track member 52 advantageously minimizes the exposure of conductor assembly 20 to contaminants and other foreign objects. Conductor assembly 20 may be affixed to track member 52 by fasteners (e.g. screws, clips, hooks, bolts, etc.), ultrasonic welding, molding, snap-fit, etc. According to an exemplary embodiment, insulating member 26 is bolted to track member 52.

Conductor assembly 20 is positioned along track member 52 of article attachment system 50 in such a way that positive rail 22 and negative rail 24 are parallel with the longitudinal length of track member 52. The coupling of conductor assembly 20 to track member 52 provides a source of electrical power along the length of track member 52 allowing electrical power to be supplied to one or more articles moveably positionable along track member 52. According to various alternative embodiments, conductor assembly 20 may be integrally formed in track member 52 of article attachment system 50. According to further alternative embodiments, conductor assembly 20 may be positioned or otherwise supported near article attachment system 50. For example, conductor assembly 20 may be coupled to or integrally formed with a vehicle component which underlies, or is positioned near, article attachment system 50.

Figure 8:
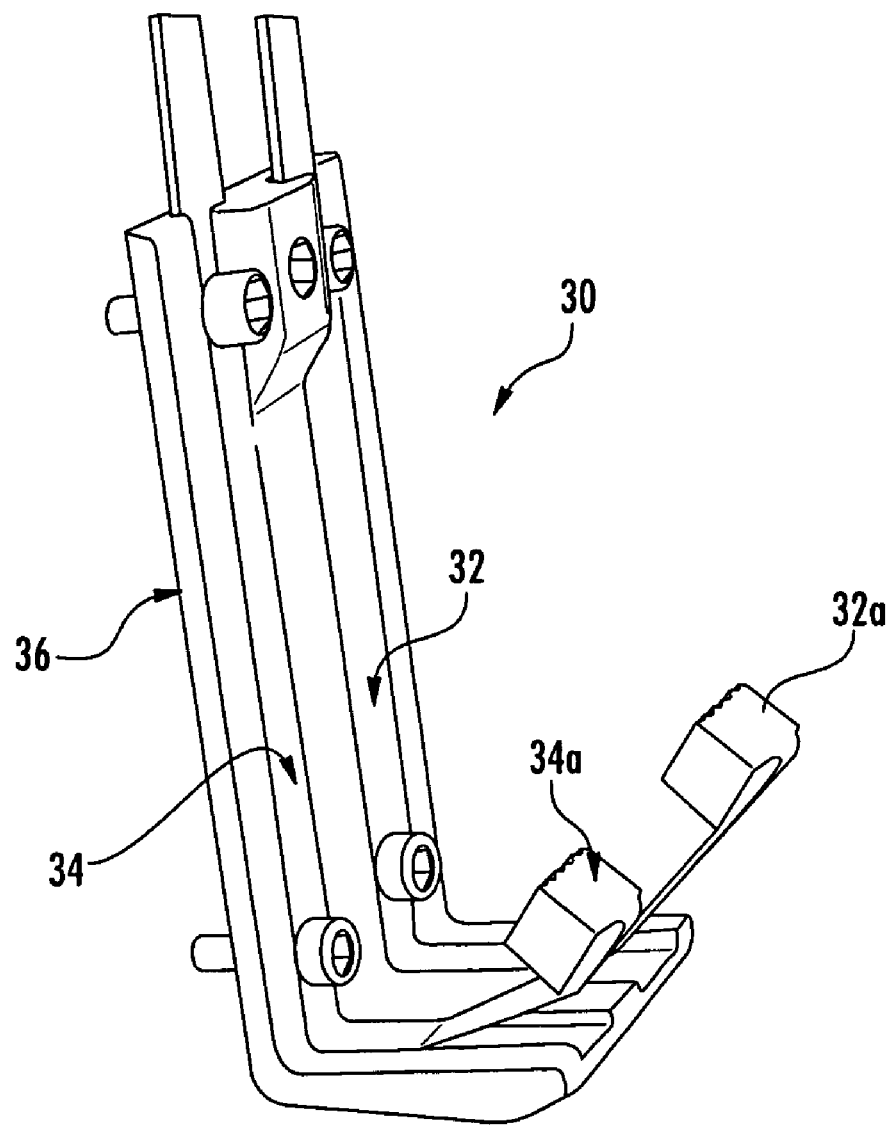
FIG. 8 is a perspective view of a contact assembly of the electrification system of FIG. 4.
Figure 9:
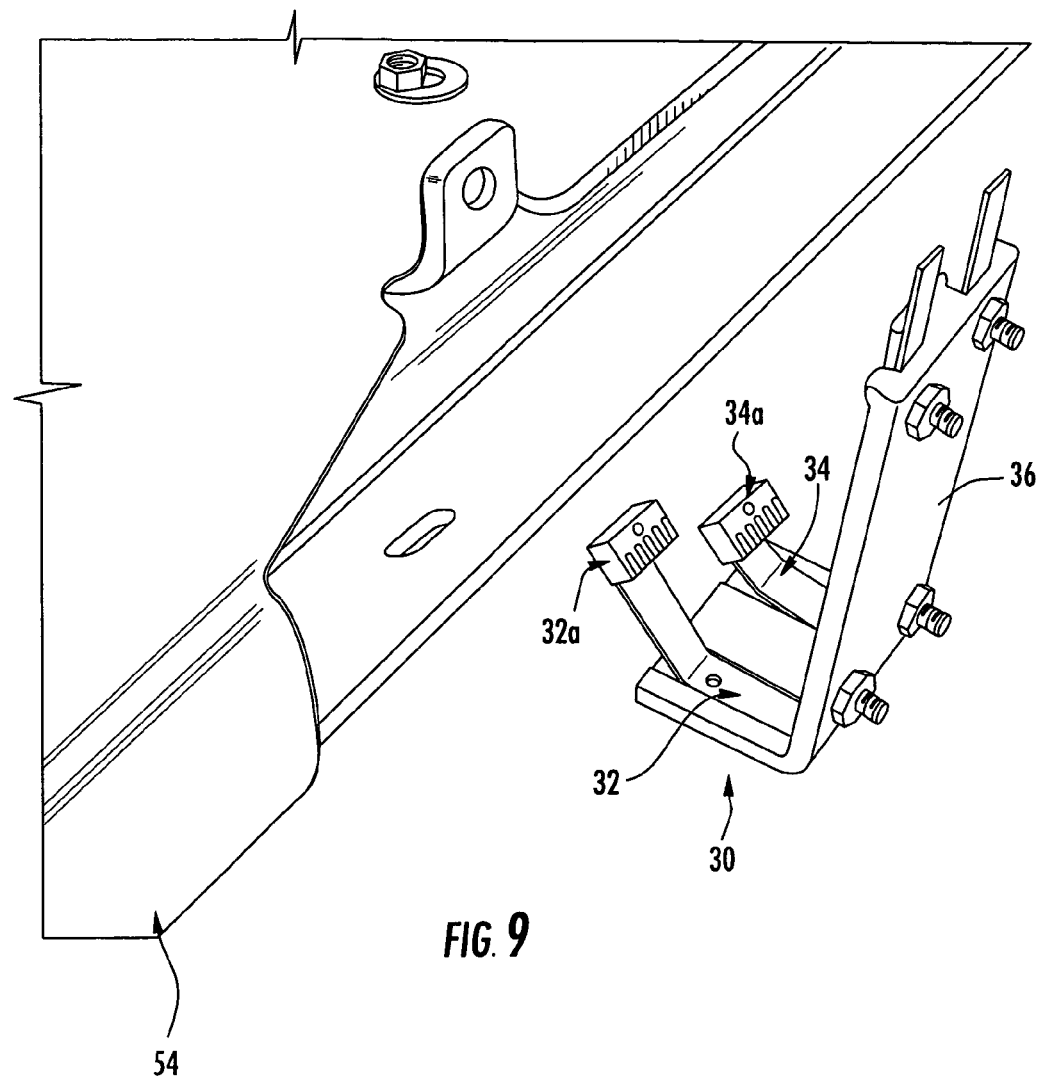
FIG. 9 is another perspective view of the contact assembly of the electrification system of FIG. 4.
Figure 10:
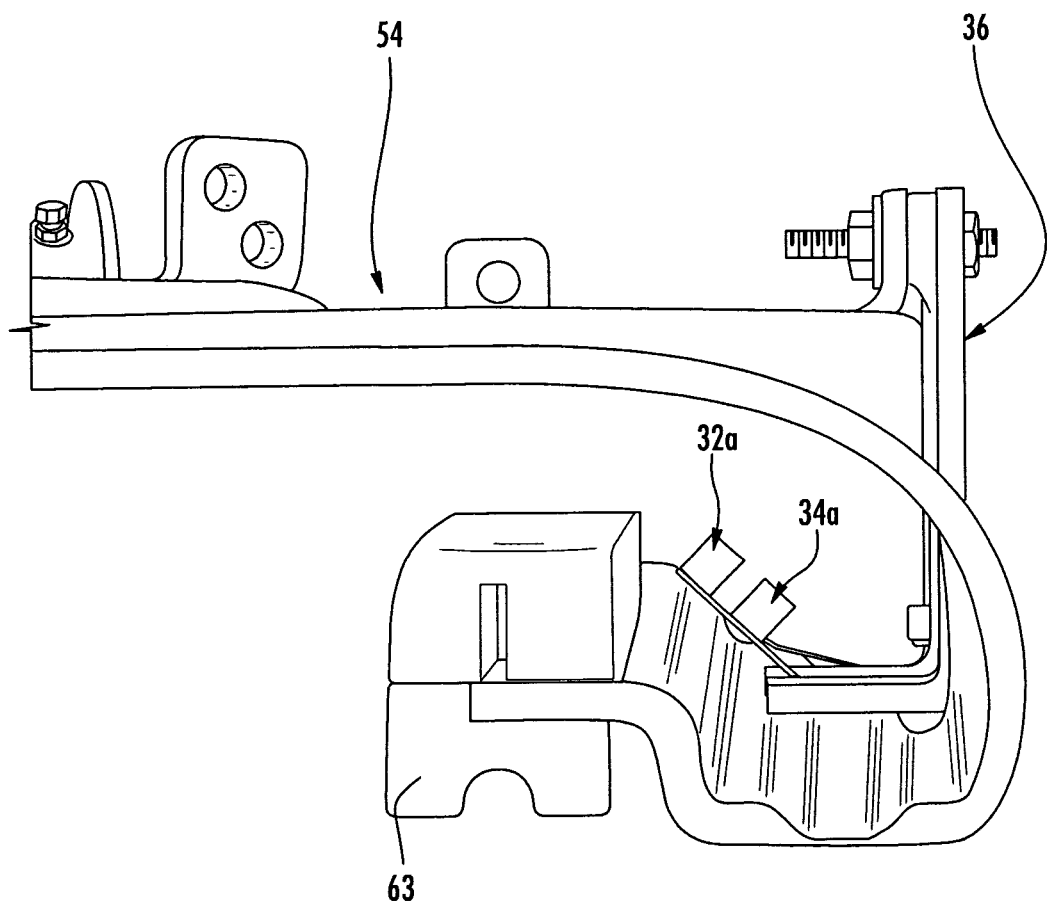
FIG. 10 is a front view of the electrification system of FIG. 4 showing the contact assembly of FIG. 8.

The electrical power traveling along the length of track member 52, and carried by conductor assembly 20, is transmitted to one or more articles coupled to article attachment system 50 by contact assembly 30. Referring to FIGS. 8 through 10, contact assembly 30 includes at least two resilient electrical contact surfaces, shown as a positive contact 32, adapted to provide electrical communication between positive rail 22 and an article coupled to article attachment system 50, and a negative contact 34, adapted to provide electrical communication between negative rail 24 and an article coupled to article attachment system 50. Contact assembly 30 is also shown as including an insulating support member (shown as carrier 36), configured to support positive contact 32 and negative contact 34 in a manner that allows the contacts to slidably engage conductor assembly 20 and couple to an article mounted to article attachment system 50.

Positive contact 32 and negative contact 34 include first and second ends, wherein the first ends are configured to slidably engage the respective positive rail 22 and negative 24 of conductor assembly 20, and the second ends are configured to engage an electrical or electronic device coupled to an article mounted to article attachment system 50. Positive contact 32 and negative contact 34 are coupled to carrier 34 and serve as a conduit for transmitting electrical power between conductor assembly 20 and an article coupled to article attachment system 50.

Positive contact 32 and negative contact 34 may be made of any conductive material such as brass, copper, aluminum, etc. and, according to an exemplary embodiment, are spring biased for urging continuous contact with the conductive surfaces of conductor assembly 20. The biasing of positive contact 32 and negative contact 34 maintains a constant pressure on the contacts to stay in constant communication with positive rail 22 and negative rail 24. Biasing will provide for constant communication even when carriage 54 is slidably moving along track member 52. According to various alternative embodiments, more than one positive contact 32 and negative contact 34 can be used to ensure that at least one positive contact 32 and one negative contact 34 stays in constant communication with conductor assembly 20.

Positive contact 32 and negative contact 34 are further shown as including brushes 32a and 34a respectively that are supported at the first ends of positive contact 32 and negative contact 34. Brush 32a is adapted to slidably engage positive rail 22, while brush 34a is adapted to slidably engage negative rail 24. According to an exemplary embodiment, brushes 32a and 34a are formed of a carbon copper composite. According to various alternative embodiments, brushes 32a and 34a may be made of any conductive material such as brass, aluminum, etc. According to the embodiment illustrated, brushes 32a and 34a are coupled to positive conduct 32 and negative contact 34 respectively. According to various alternative embodiments, brushes 32a and 34a are integrally formed with positive contact 32 and negative contact 34 to form a unitary one-piece member. The increased material that brushes 32a and 34a provide increases the number of cycles that electrification system 10 can run before the contact surfaces coupled to carrier 36 need to be replaced. Further, brushes 32a and 34a advantageously provide for the self-cleaning of positive rail 22 and negative rail 24. For example, as brushes 32a and 34a slidably engage positive rail 22 and negative 24, the brushes remove any contaminants and other foreign objects located on the conductor assembly.

In operation, conductor assembly 20 is fixed relative to track member 52, while contact assembly 30 is fixed relative to carriage 54. As detailed above, carriage 54 is adapted to engage track member 52 in a reciprocatingly slidable relationship and to support in a movable or stationary manner an article (e.g., console 200, etc.). Contact assembly 30 is fixed relative to carriage 54 in a manner that provides electrical communication between the second ends of positive contact 32 and negative contact 34 and an article coupled to carriage 54. The first ends of positive contact 32 and negative contact 34 slidably engage positive rail 22 and negative rail 24 respectively. While the FIGURES only illustrate one carriage being coupled to the track member, it should be appreciated that a plurality of carriages, each supporting an article needing electrical power, may be simultaneously coupled to the track member. Any additional carriages coupled to the track member may utilize the electrical power provided by conductor assembly 20 by coupling an additional contact assembly 30 to each carriage. In addition, articles may be detachably coupled to conductor assembly 20 without being first coupled to a carriage. For such a configuration, contact assembly 30 may be integrally formed with an article to be coupled. For example, two conductive surface may extend from the article and operatively engage conductor assembly 20.

According to an exemplary embodiment, a low-voltage electrical power in the range of about 3.0 to 80 volts DC and about 1 mA to 100 amps or other suitable voltage and current range for powering the article is routed from the vehicle electrical system to one or more articles coupled to article attachment system 50 via conductor assembly 20. Preferably, electrification system 10 is configured to operate at approximately 13.7 volts and approximately 30 amps. Wires coupled to an end of conductor assembly operatively connect positive rail 22 and negative rail 24 to the power supply of the vehicle. A plurality of methods can be used to connect the wires to the conductor assembly including, but not limited to, soldering, ultrasonic welding, crimping, or cold forming the ends of positive rail 22 and negative 24 so that a connector can be fitted on the ends.

It is important to note that the construction and arrangement of the elements of the electrification system provided herein are illustrative only. Although only a few exemplary embodiments of the present invention have been described in detail in this disclosure, those skilled in the art who review this disclosure will readily appreciate that many modifications are possible in these embodiments (such as variations in installation location and orientation within a vehicle, sizes, structures, shapes and proportions of the various elements, mounting arrangements, use of materials, combinations of shapes, etc.) without materially departing from the novel teachings and advantages of the invention. For example, the electrification system may be used in the interior or exterior of any vehicle application. Also the electrification system may have any suitable shape, length, location or orientation for use with any article attachment system.

Additionally, the electrification system may be configured to provide electrical power to an article attachment system providing movement of an article in any direction, not just movement in the fore and aft directions (e.g. in the up and down direction, in a non-linear direction, in a non-planar direction, in a curvilinear direction, etc.) Additionally, the electrification system may accept the coupling of any electrical or electronic devices that is permanently coupled to the vehicle or detachably coupled to the vehicle. Further, it is readily apparent that the conductive surfaces of the conductor assembly may be provided in a wide variety of shapes, sizes, thickness, and materials. Also, the conductor assembly is adapted for installation along the roof, floor and sides of a vehicle, or within a cargo area or other suitable location within a vehicle. It is also readily apparent that articles may be in the form of any removable or permanent object useful in connection with a vehicle and may be designed with any profile suitable for attaching to an article attachment system or directly to the electrification system. The article in the form of a console may be any suitable size to hold beverage cups, cans, and the like and includes electrical ports, such as those used for cigarette lighters, the connection of cellular telephone charging devices, etc. Accordingly, all such modifications are intended to be within the scope of the appended claims.

While the present invention has been described in connection with a particularly preferred embodiment thereof, the invention is not to be limited by the FIGURES. The order or sequence of any process or method steps in the claims may be varied or re-sequenced according to alternative embodiments. Any functional elements are intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed in the appended claims.

What is claimed is:
1. An electrification system for use with an article slidably supported on a track within a vehicle, the electrification system comprising:
  a conductor assembly including a positive conductive interface supported parallel and adjacent to a negative conductive interface, the conductor assembly configured to extend substantially the length of the track; and a contact assembly including a positive contact in electrical communication with the positive conductive interface and a negative contact in electrical communication with the negative conductive interface, the contact assembly configured to be fixed relative to the article, wherein the contact assembly remains in electrical communication with the conductor assembly as the article is selectively moved along the track to provide continuous electrical power to the article as the article is moved.

2. The electrification system of claim 1, wherein the conductor assembly further includes an insulator electrically separating the positive conductive interface from the negative conductive interface.

3. The electrification system of claim 2, wherein the insulator supports the positive conductive interface at the position that is parallel and adjacent to the negative conductive interface.

4. The electrification system of claim 3, wherein the insulator includes a first channel configured to receive the positive conductive interface and a second channel configured to receive the negative conductive interface.

5. The electrification system of claim 3, wherein the insulator is configured to be coupled directly to the track.

6. The electrification system of claim 1, wherein the contact assembly further includes a positive brush supported at end of the positive contact and the negative brush supported at the end of the negative contact, the positive brush slidably engages the positive conductive interface, the negative brush slidably engages the negative conductive interface.

7. The electrification system of claim 6, wherein a first spring biases the positive brush for sliding engagement with the positive conductive interface and a second spring biases the negative brush for sliding engagement with the negative conductive interface.

8. The electrification system of claim 7, wherein the first spring is integrally formed with the positive contact and provided as a one-piece unitary member, and the second spring is integrally formed with the negative contact and provided as a one-piece unitary member.

9. The electrification system of claim 1, wherein the contact assembly further includes a carrier which supports and electrically separates the positive contact and the negative contact.

10. The electrification system of claim 9, wherein the carrier includes a first portion for supporting the positive and negative contacts in a substantially vertical orientation and a second portion for supporting the positive and negative contacts in a substantially horizontal orientation.

11. A sliding console system for a vehicle, the console system comprising:

a track having a length;

a console supported on the track and configured for sliding movement relative to the track;

a conductor assembly at least partially extending along the length of the track, the conductor assembly including a positive conductive interface supported parallel and adjacent to a negative conductive interface;

a contact assembly fixed relative to the console, the contact assembly including a positive contact in electrical communication with the positive conductive interface and a negative contact in electrical communication with the negative conductive interface, wherein the contact assembly remains in electrical communication with the conductor assembly as the console slides relative to the track to provide continuous electrical power to the console.

12. The sliding console system of claim 11, wherein the track is located on the floor of the vehicle and orientated generally perpendicularly with respect to an instrument panel of the vehicle.

13. The sliding console system of claim 12, wherein the console includes at least one of an electrical port, an electrical control, and an electronic device.

14. The sliding console system of claim 13, wherein the console further includes at least one of a cup holder, a tray, a storage compartment, and an armrest.

15. The sliding console of claim 11, wherein the conductor assembly is supported within a channel defined by the track and substantially shielded by the track from contaminants.

16. The sliding console of claim 11, wherein the console is coupled to a carriage which slidably engages the track.

17. The sliding console of claim 16, wherein the carriage supports the contact assembly.

18. A method of providing electrical power to at least one article slidably supported within a vehicle, the method comprising:

providing a conductor assembly and a contact assembly;

fixedly coupling the conductor assembly relative to the vehicle, the conductor assembly including a positive conductive surface positioned parallel to a negative conductive surface and an insulator electrically separating the positive conductive surface from the negative conductive surface;

fixedly coupling the contact assembly relative to the article, the contact assembly including a resilient positive contact and a resilient negative contact;

slidably engaging the positive contact with the positive conductive surface and the negative contact with the negative conductive surface; and providing electrical power to the conductor assembly to provide power at the article.

19. The method of claim 18, further comprising the step of biasing the positive contact toward the positive conductive surface and the negative contact toward the negative conductive surface.

20. The method of claim 19, further comprising the step of providing a positive brush at the end of the positive contact and a negative brush at the end of the negative contact.

* * * * *